United States Patent
Elenes et al.

(10) Patent No.: US 10,289,840 B2
(45) Date of Patent: May 14, 2019

(54) INTEGRATED CIRCUIT WITH TAMPER PROTECTION AND METHOD THEREFOR

(71) Applicant: Silicon Laboratories Inc., Austin, TX (US)

(72) Inventors: Javier Elenes, Austin, TX (US); Sebastian Ahmed, Austin, TX (US); Lars Lydersen, Trondheim (NO)

(73) Assignee: SILICON LABORATORIES INC., Austin, TX (US)

( * ) Notice: Subject to any disclaimer, the term of this patent is extended or adjusted under 35 U.S.C. 154(b) by 5 days.

(21) Appl. No.: 15/612,841

(22) Filed: Jun. 2, 2017

(65) Prior Publication Data

US 2018/0349600 A1 Dec. 6, 2018

(51) Int. Cl.
  *G06F 21/55* (2013.01)
  *G06F 21/72* (2013.01)

(52) U.S. Cl.
  CPC .......... *G06F 21/554* (2013.01); *G06F 21/556* (2013.01); *G06F 21/725* (2013.01)

(58) Field of Classification Search
  CPC ..... G06F 21/554; G06F 21/556; G06F 21/725
  See application file for complete search history.

(56) References Cited

U.S. PATENT DOCUMENTS 9,046,570 B2 * 6/2015 Olmos ............. G01R 31/31719
9,523,736 B2 * 12/2016 Hershman ............ H03K 19/003

2011/0043245 A1 * 2/2011 Buard ..................... G06F 21/55
  326/8
2013/0055025 A1 * 2/2013 Feix ....................... G06F 21/554
  714/32
2015/0130502 A1 * 5/2015 La Rosa ............... G06F 21/552
  324/764.01
2016/0116893 A1 * 4/2016 Justin .................... G05B 11/01
  700/79

OTHER PUBLICATIONS

EFM32WG995, Product Data Sheet, Silicon Laboratories Inc, Jun. 2014, 85 pages, EFM32WG995FXX—d0204_Rev1.40, Silicon Laboratories Inc, 400 West Cesar Chavez, Austin, TX 78701 United States.

(Continued)

*Primary Examiner* — Mohamed Barakat
(74) *Attorney, Agent, or Firm* — Polansky & Associates P.L.L.C.; Paul J. Polansky; Rosalynn M. Smith

(57) ABSTRACT

An integrated circuit includes a tamper sensor that has plurality of state circuits. Each of the plurality of state circuits has a respective output that provides a respective logic state. When operating properly, the respective logic state is toggled in response to a clock signal. The respective logic state fails to toggle in response to a respective fault injection. The tamper sensor has an output that provides a fault signal in response to a difference in the respective logic state of the plurality of state circuits. Additionally, the integrated circuit includes a protected circuit, as well as a tamper response circuit. The tamper response circuit is connected to the tamper sensor and to the protected circuit. The tamper response circuit executes a protection operation to secure the protected circuit in response to the fault signal.

30 Claims, 9 Drawing Sheets

(56) References Cited

OTHER PUBLICATIONS

Ordas, S., et al., "Electronic Fault Injection: the curse of flip-flops," Journal of Cryptographic Engineering, DOI:10.1007/s13389-016-0128-3, Mar. 2016, 16 pages.

Moro, N., et al., "Electromagnetic fault injection: towards a fault model on a 32-bit microcontroller," IEEE, 2013, 12 pages.

Moro, N., et al., "Experimental evaluation of two software countermeasures against fault attacks," IEEE-Host Symposium, May 2014, 22 pages, Arlington, VA, United States.

Hummel, T., "Exploring Effects of Electromagnetic Fault Injection on a 32-bit High Speed Embedded Device Microprocessor," Master Thesis—EIT ICT Labs Master School, Jul. 27, 2014, 76 pages, Univeristy of Twente, Enschede, Netherlands.

Moro, N., et al., "Formal verication of a software countermeasure against instruction skip attacks," JCEN, Feb. 24, 2014, France, 17 pages.

\* cited by examiner

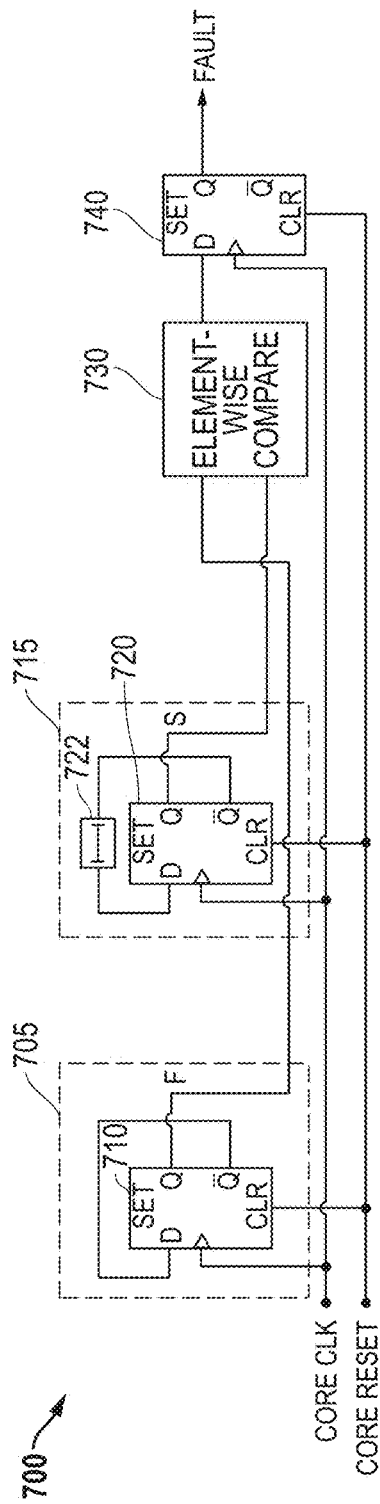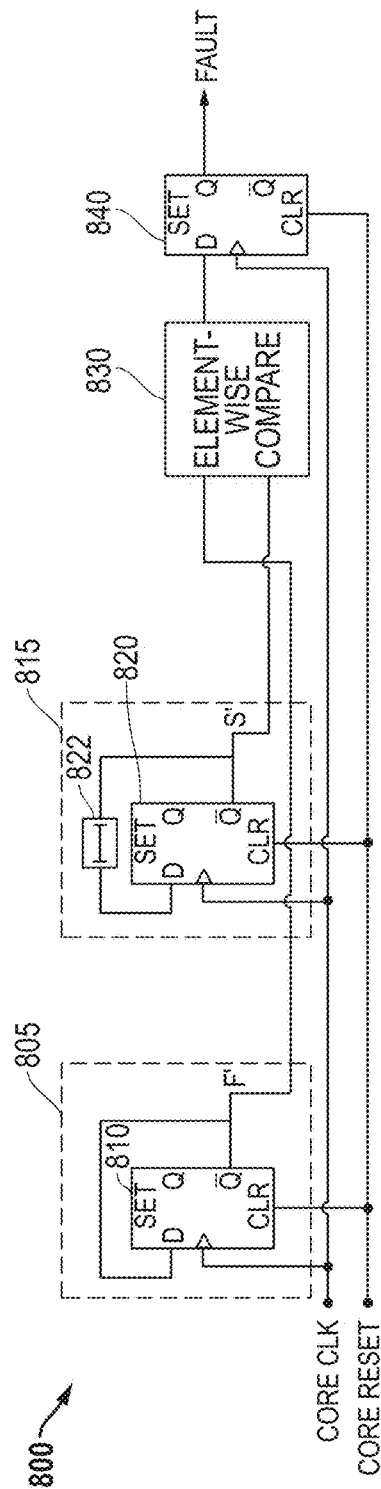

INTEGRATED CIRCUIT WITH TAMPER PROTECTION AND METHOD THEREFOR

FIELD

This disclosure relates generally to security circuitry, and more specifically to tamper protection circuits for secure integrated circuits.

BACKGROUND

Hackers attempt to gain access to cryptographic integrated circuits, such as smart card controllers, in an effort to steal valuable user data, passwords, and the like. One technique hackers use is to inject electrical faults to cause circuits to malfunction in ways that give the hackers access to the memory and other resources of the integrated circuit. Fault injections are a serious threat against secure circuits. There are multiple methods utilized to inject faults within cryptographic circuits. Among the methods are laser, voltage, and electromagnetic (EM) fault injection. Laser fault injection is a popular method due to its high spatial and temporal resolutions. However, the use of laser for fault injection has limitations. An increased number of metal layers for routing signals in a chip, as well as progressive countermeasures increase the inefficiency of laser attacks. Voltage spike injection is also utilized by injecting a voltage spike directly into a substrate of a targeted integrated circuit. Voltage spike injection produces ground bounces or voltage drops with respect to the intensity of the spike. EM fault injection via a targeted electromagnetic pulse is more commonly being utilized for targeted attacks that aim to disrupt logic circuit behavior within integrated circuits.

Two types of EM injection platforms are known to be mounted to induce faults into circuits. The Harmonic EM injection platform produces sine EM waves that can be modulated to produce faults. Harmonic EM injections may disturb the behavior of an internal clock of an integrated circuit, as well as bias a true random number generator. Additionally, EM Pulse (EMP) injection, produced with a high voltage pulse generator and an injector, has been shown to create faults exploitable from a cryptanalysis point of view. EMP injection produces a single but powerful EMP at a desired time and location on a targeted integrated circuit that creates a sudden current flow in the power ground networks of the targeted integrated circuit, thereby creating voltage drops, ground bounces, and timing faults. Each of these forms of fault injection is difficult to defend against. As devices become smaller and more pervasive in our environment, the susceptibility to security breach becomes increasingly more important and more difficult to counter.

BRIEF DESCRIPTION OF THE DRAWINGS

FIG. 7 illustrates in block diagram form a hold time and setup time violation detection circuit according to some embodiments.

FIG. 8 illustrates in block diagram form a hold time and setup time violation detection circuit according to some embodiments.

Figure 1:
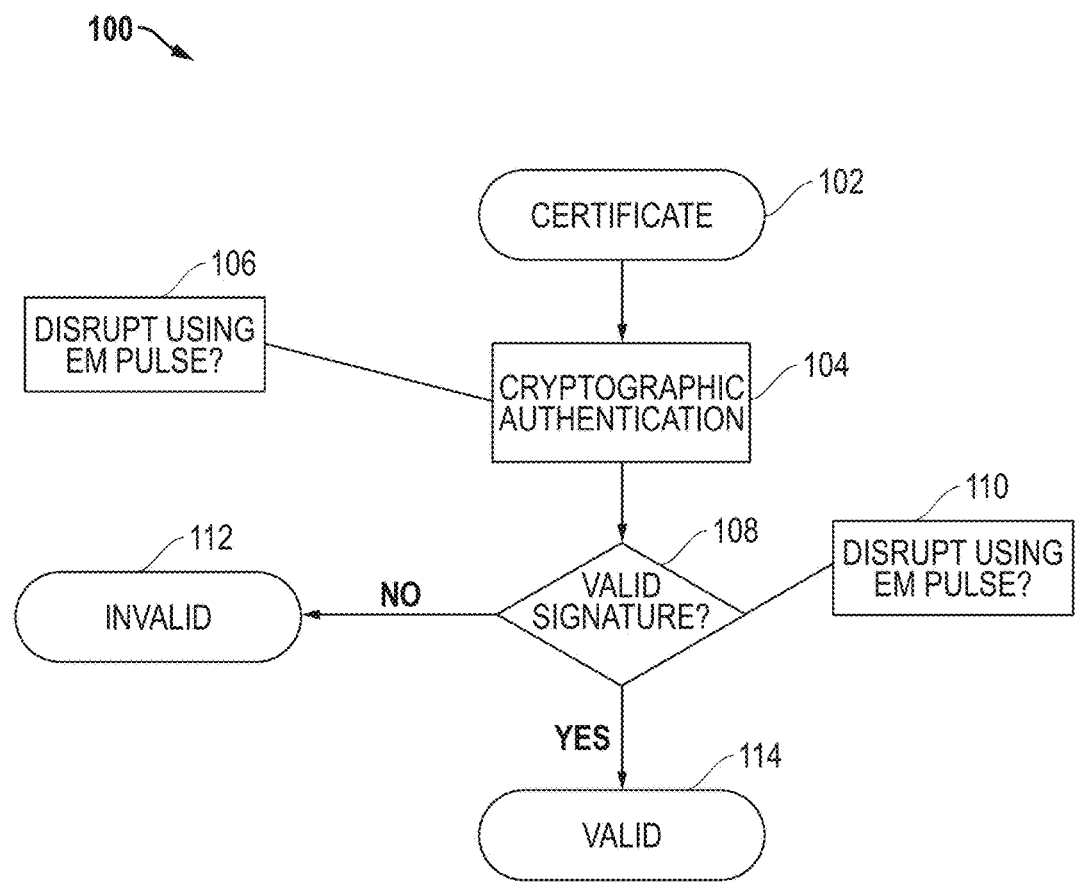
FIG. 1 illustrates a flow diagram of a method for cryptographic authentication of an integrated circuit during an electromagnetic pulse disruption according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form, an integrated circuit includes a tamper sensor that has plurality of state circuits. Each of the plurality of state circuits has a respective output that provides a respective logic state. When operating properly, the respective logic state is toggled in response to a clock signal. The respective logic state fails to toggle in response to a respective fault injection. The tamper sensor has an output that provides a fault signal in response to a difference in the respective logic state of the plurality of state circuits. Additionally, the integrated circuit includes a protected circuit, as well as a tamper response circuit. The tamper response circuit is connected to the tamper sensor and to the protected circuit. The tamper response circuit executes a protection operation to secure the protected circuit in response to the fault signal.

In still another embodiment, a tamper sensor detects a fault injection. Each of plurality of state circuits has a respective output that provide a respective logic state. The respective logic state toggles in response to a clock signal when the tamper sensor operates properly. The respective logic state fails to toggle in response to a respective fault injection. A comparison circuit compares an output of the plurality of state circuits. The comparison circuit provides a respective output. The tamper response circuit connects to a register that has an input connected to the output of the comparison circuit. The tamper response circuit also connects to a clock input for receiving the clock signal and an output that provides a fault signal in response to a difference in the respective logic state of the plurality of state circuits.

FIG. 1 illustrates a flow diagram of a method 100 cryptographic authentication of an integrated circuit during an electromagnetic pulse disruption according to some embodiments. At block 102, a cryptographic certificate is utilized to delegate host firmware development and debug access to an authorized developer. Cryptographic authentication is executed at block 104. At block 106, a fault injection such as an electromagnetic (EM) pulse (EMP) is applied to the integrated circuit during cryptographic authentication. A fault injection may also be implemented via voltage glitching and clock glitching. A decision is made, at block 108, whether the EMP induces a disruption during validation of the signature. During the process of signature validation, at block 108, a subsequent EMP is applied, at block 110. In response to detecting an EMP of sufficient intensity to disrupt the integrated circuit at either block 106 or 110, the signature is determined to be invalid, and the firmware integrity is protected. In response to the tamper sensor determining the signature is valid, the firmware boot process continues.

Figure 2:
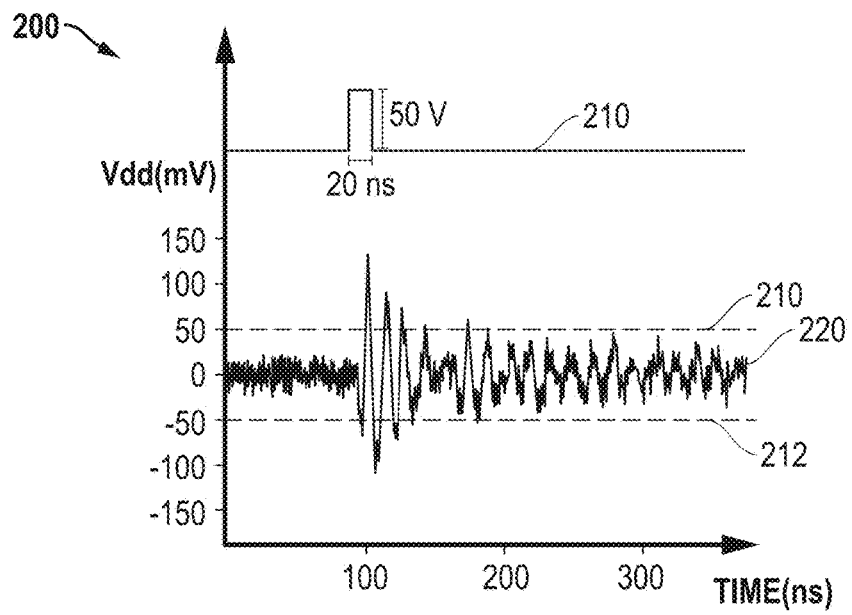
FIG. 2 illustrates a timing diagram of internal voltage oscillations during electromagnetic fault injection for disrupting logic circuit behavior.

FIG. 2 illustrates a timing diagram of internal/localized voltage oscillations during EM fault injection for disrupting logic circuit behavior according to some embodiments. Graph 200 shows a waveform 220 of the deviation of the power supply voltage (Vdd) from its nominal value, threshold 210 and 212. A method for inducing faults in an integrated circuit is using EMP. In the example of FIG. 2, an EMP is injected at around 100 nanoseconds (ns) and causes an oscillation of Vdd. Vdd oscillation causes timing violations when the deviation is outside of predefined limits, where threshold 210 is an upper limit that designates the hold violation limit, and threshold 212 is a lower limit that designates the setup violation limit. The EMP produces timing faults as a result of voltage glitches. Threshold 210 depicts a high Vdd deviation at +50 mV, and a low Vdd deviation of −50 mV. A targeted attack that aims to disrupt logic circuit behavior using an EMP provides a pulse to the integrated circuit device having a tamper sensor. Accordingly, an EMP injection yielding a supply voltage deviation greater than threshold 210 (deviation >50 mV) induces a hold time fault in the tamper sensor. An EMP injection yielding a supply voltage deviation less than threshold 212 (deviation <−50 mV) induces a hold time fault in the tamper sensor.

Figure 3:
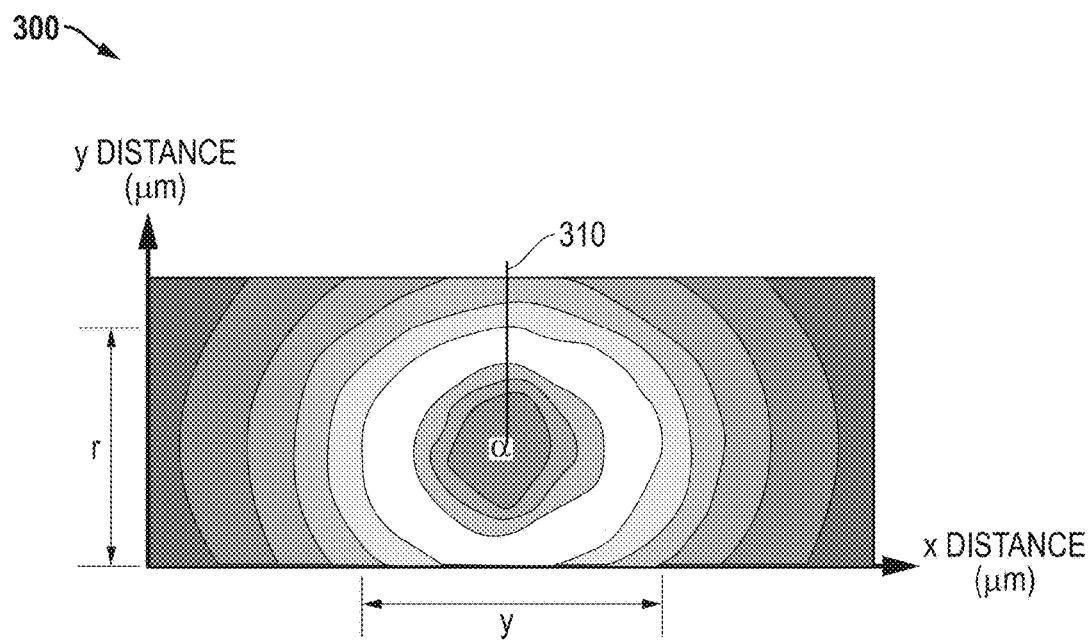
FIG. 3 illustrates a diagram of electromagnetic pulse induced magnetic field in an integrated circuit device.

FIG. 3 illustrates a diagram of EMP induced magnetic field distribution in an integrated circuit device according to some embodiments. Diagram 300 shown an EM probe 310 in proximity to the active surface of an integrated circuit. In one example, EMP injection generates an intense and sudden variation of the magnetic field in a vicinity close to the targeted device and/or portion of the targeted device. EMP probe 310 has a one-turn, 100 micrometer (µm) in diameter loop and induces a magnetic field in the target device that diminishes as the distance from the injection increases. The faults induced by EMP probe 310 may be highly localized, as illustrated in diagram 300.

Figure 4:
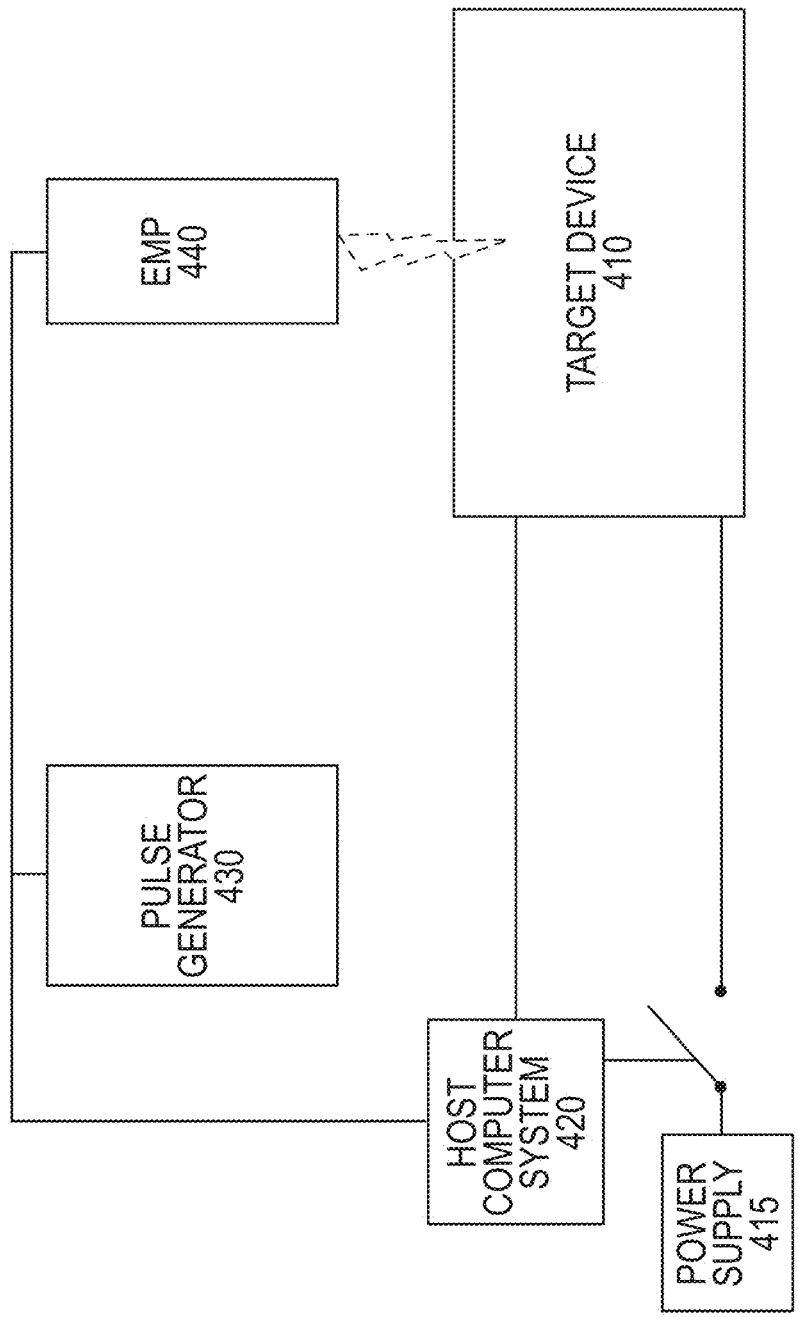
FIG. 4 illustrates in block diagram form an electromagnetic pulse fault injection system that a hacker may use to implement the fault injection of FIG. 3.

FIG. 4 illustrates in block diagram form an EMP fault injection system 400 according to one embodiment that can be used to inject a localized EMP of the type shown in FIG. 3. EMP fault injection system 400 includes a target device 410, a power supply 415, a host computer system 420, a pulse generator 430, and an EMP probe 440. Host computer 420 is connected to power supply 415, pulse generator 430, EMP probe 440, and target device 410.

In one example, host computer 420 executes an EMP sweep on target device 410. Host computer system 420 is utilized to provide invalid boot firmware to target device 410. Pulse generator 430 provides the EMP to EMP probe 440 for injecting the fault to target device 410. EMP probe 440 is a miniaturized EMP injector positioned above target device 410. EMP probe 440 discharges a capacitor bank into a coil upon receiving a pulse from pulse generator 430, thereby creating an EMP. Pulse generator 430 waits a predefined time (glitch offset) and emits a pulse when a trigger signal is asserted by target device 410. Host computer system 402 communicates with target device 410 and monitors the behavior of target device 410. In one example, power supply 415 is an interruptible power supply that enables host computer system 420 to interrupt the power supply to target device 420 to force a reboot of the target device. In another example, power supply 415 is a control input that causes target device 410 to repeat a critical sequence during the boot operation.

A stepper motor is utilized for manipulating target device 410 and/or EMP probe 440. A voltage pulse of a specified amplitude is applied (e.g. voltage: 200 V, current: 8 A) by EMP probe 440 to a localized area for a specified duration (e.g. 5 ns to 100 ns) at the surface of target device 410. Host computer system 420 initiates a glitch sweep of the EMP across the surface of target device 410 to generate a timing fault during boot of target device 410. In one example the sweep is performed at a fixed glitch offset (time) at a predetermined glitch intensity and duration. Initiating at a first location, target device 410 is reset, EMP probe 440 applies the EMP, and host computer system 420 detects a result. EMP probe 440 is stepped to the next location and the process is repeated. Host computer system 420 continues to monitor target device 410 to determine when target device 410 fails to operate properly during the firmware boot authentication operation, allowing host computer system 420 to provide instructions that allow memory on target device 410 to be read and altered.

Figure 5:
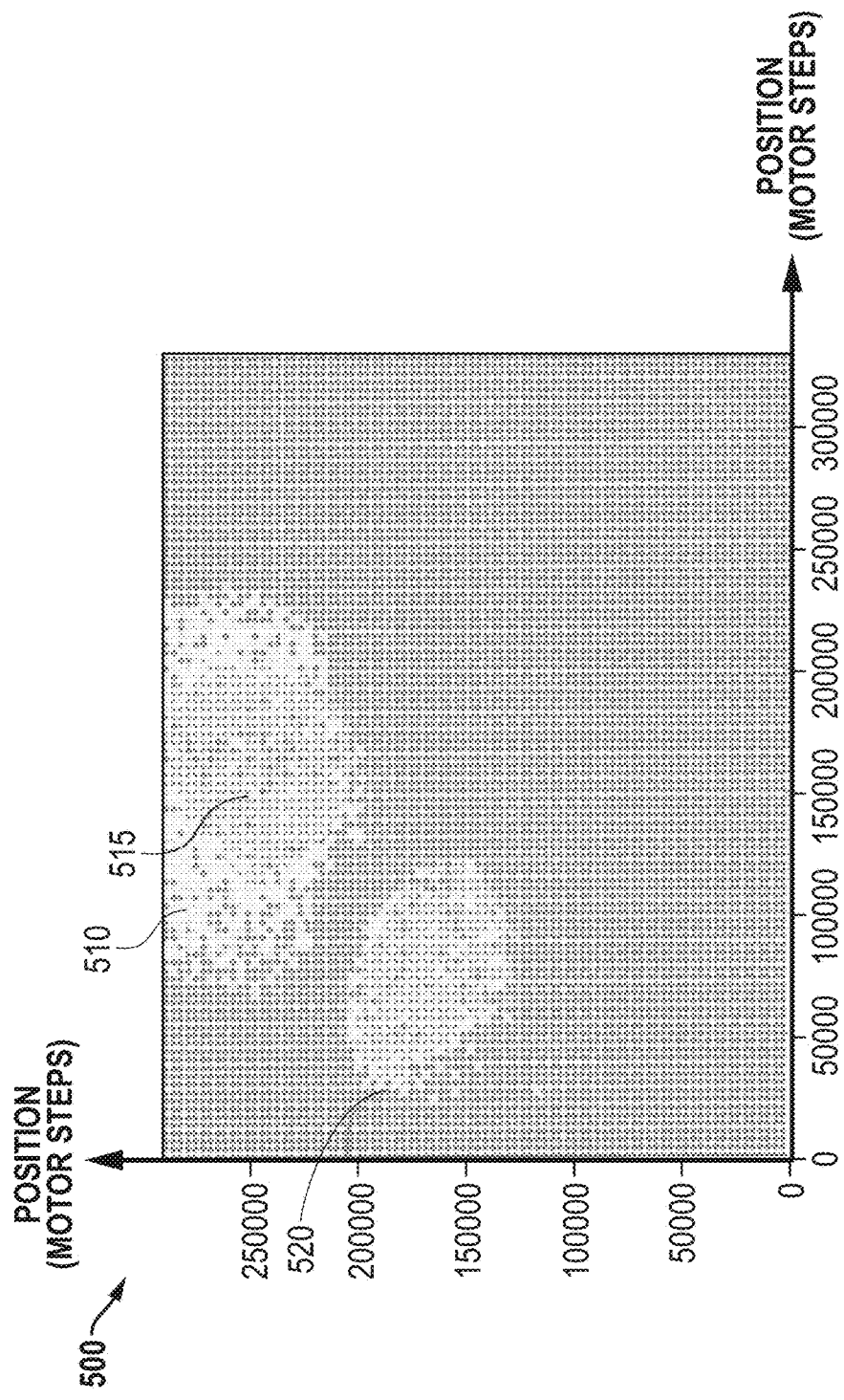
FIG. 5 illustrates in graphical form an electromagnetic fault injection glitch analysis.

FIG. 5 illustrates in graphical form an electromagnetic fault injection glitch analysis according to some embodiments. Graph 500 includes glitch results 510, 515, and 520. In one example, a system, similar to FIG. 4 is utilized to provide the glitch analysis of graph 500. A sweep is performed on target device, e.g. a microcomputer having a Cortex-A8 core processor licensed by Advanced RISC Machines, Ltd. of Cambridge, England, running a test program. The goal of the EMP fault injection system (FIG. 4) is to inject a fault at a time from reset, and at a location on the integrated circuit to cause the integrated circuit to fail while executing the authentication operation so that malicious firmware can be provided to the target device. The sweep initiates at a first XY position and continues across the whole surface of the device at a fixed amount of time after reset, known as the "glitch offset". The EMP is set at a fixed intensity and duration. The parameters are applied to the target device until the desired behavior is obtained. Area 510 represents abnormal results which identifies that the EMP injection created a glitch that would enable a hacker to interrupt the authentication process. Area 515 represent a non-answering target, and area 520 represents an expected result was received.

Figure 6:
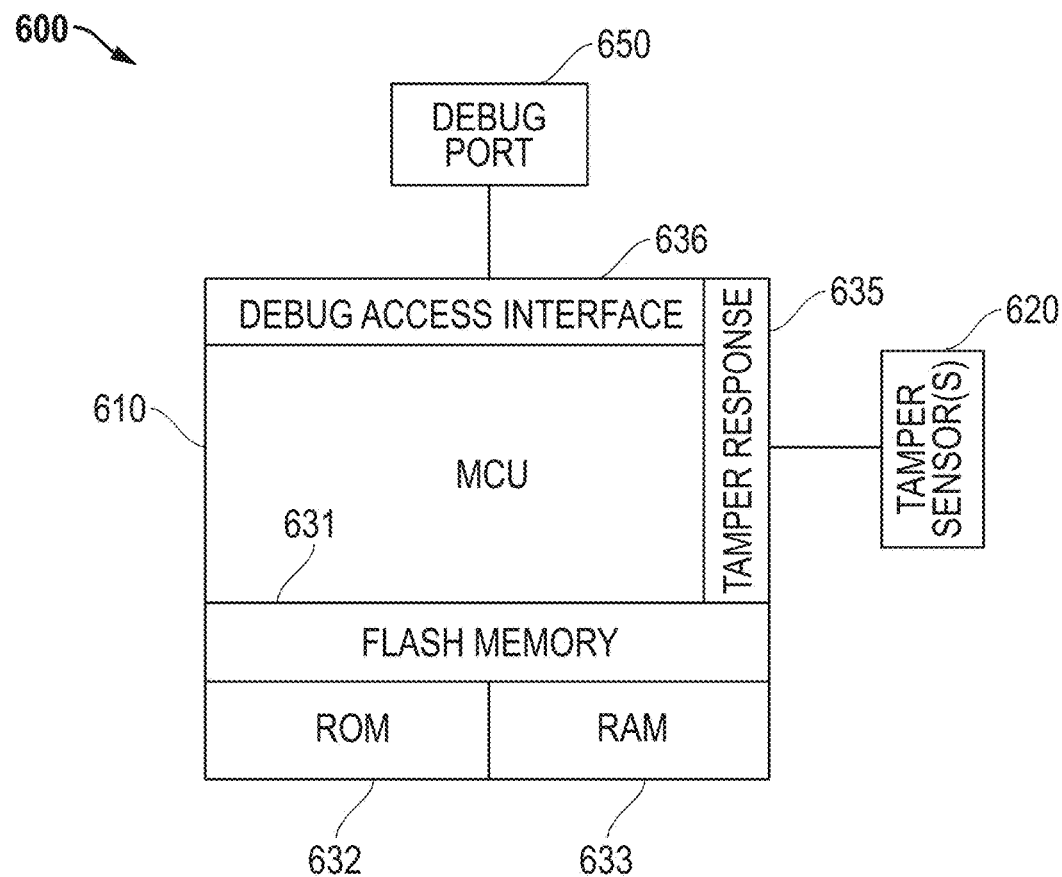
FIG. 6 illustrates in block diagram form an exemplary secure integrated circuit according to some embodiments.

FIG. 6 illustrates in block diagram form an exemplary secure integrated circuit 600 according to some embodiments. Integrated circuit 600 is a protected circuit that includes microcontroller unit (MCU) 610, tamper sensor(s) 620, flash memory 631, read-only memory (ROM) 632, random access memory (RAM) 633, tamper response circuit 635, debug interface circuit 636, and debug port 650.

MCU 610 is a processing device connected to ROM 632 and RAM 633. MCU is also connected to flash memory 631, tamper response 635, and debug interface circuit 636. ROM 632 is non-volatile memory for storing firmware associated with the integrated circuit. RAM 633 is utilized for program data storage. Flash memory 631 is a non-volatile storage medium that retains data in the absence of a power supply, and can be electrically erased and reprogrammed. Blocks of flash memory 631 can be erased, and flash memory 631 can also be erased in whole.

Debug port 650 connects to debug interface circuit 636. Debug interface circuit 636 is an electronic interface that provides access to debug information stored on MCU 610. Debug port 650 simplifies development and debugging of MCU 610; however, debug port 650 is also utilized by hackers to obtain access to firmware, functionalities, and secret data provided by MCU 610, another processor, a peripheral device, and/or a memory component connected to MCU 610. A host can manage and query a target associated with debug interface circuit 636 via debug port 650. Debug interface circuit 636 only allows MCU debug access if proper cryptographic unlock credentials are provided by the debug port.

Tamper response circuit 635 is connected to debug interface circuit 636, MCU 610, and the memory blocks (flash memory 631, ROM 632, and RAM 633). Tamper response circuit 635 receives a fault signal from tamper sensor(s) 620, and executes a protection operation to secure components of integrated circuit 600 in response to the fault signal. Tamper response circuit 635 selectively issues a response to debug interface circuit 636, MCU 610, or flash memory 631 when a fault signal is received from tamper sensor(s) 620, thereby identifying a security disruption to integrated circuit 600.

Tamper sensor(s) 620 includes a plurality of state circuits each having a respective output that provides a respective logic state. The logic states are toggled in response to a clock signal when the logic states are operating properly. In response to a fault injection, the logic states of one or more tamper sensors fail to toggle in response to the clock signal. Tamper sensor 620 has an output that provides a fault signal in response to a difference in respective logic state of the plurality of state circuits.

In operation, integrated circuit 600 provides secure functions, provides storage of secure keys, and/or provides storage of protected information. Information stored in flash memory 631 is protected by a cryptographic authentication operation. During boot of integrated circuit 600, tamper sensor(s) 620 detects a fault injection, and outputs a fault signal to tamper response circuit 635. Tamper response circuit 635 dynamically provides a response to the fault signal. For example, tamper response circuit 635 can reset integrated circuit 600. In another example, tamper response circuit 635 selectively erases sensitive information from integrated circuit 600. In still another example, tamper response circuit 635 enables debug interface 636 to invalidate a cryptographic authentication operation and lock access to debug interface 636. Tamper response circuit 635 erases secrets and/or functions of integrated circuit 600 in response to detection of a fault injection by tamper sensor(s) 620 in accordance with a tamper-response policy defined during the manufacturing stage.

Tamper sensor(s) 620 detect timing faults induced by fault injection attacks on the integrated circuit. More specifically, tamper sensor(s) 620 detect hold time violations and setup time violations induced by fault injection attacks.

FIG. 7 illustrates in block diagram form a tamper sensor 700 according to some embodiments. Tamper sensor 700 includes a hold time violation detection circuit 705, labeled "F" formed using a memory element such as a clocked D flip-flop 710, a setup time violation detection circuit 715 labeled "S" formed using a memory element such as a clocked D flip-flop 720 and a delay element 722, an elementwise compare circuit 730, and a clocked D flip-flop 740. Clocked D flip-flop 710 has a D input, a clock input for receiving a signal labeled "CORE CLK", a clear input for receiving a signal labeled "CORE RESET", and an inverted output labeled "$\overline{Q}$" connected to the D input, to form hold time violation detection circuit 705. Clocked D flip-flop 720 has a D input connected to a delay element 722, a clock input for receiving the CORE CLK signal, a clear input for receiving the CORE RESET signal, and an inverted output $\overline{Q}$ connected to delay element 722, to form setup time violation circuit 715. Elementwise compare circuit 730 has a first input connected to the Q (true) output of clocked D flip-flop 710, a second input connected to the Q (true) output of clocked D flip-flop 720, and an output. Clocked D flip-flop 740 has D input connected to the output of elementwise compare circuit 730, a clock input for receiving the CORE CLK signal, a clear input for receiving the CORE RESET signal, and an output for providing a signal labeled "FAULT".

Elementwise compare circuit 730 detects a difference in logic state at the output of clocked D flip-flops 710 and 720 that would be encountered after the application of a fault injection such as an EMP pulse of a sufficient magnitude. Upon receipt of the CORE RESET signal, D flip-flops 710 and 720 assume the same logic state, with their Q outputs set to "0". All circuits of tamper sensor circuit 700 have a common clock. If a fault injection is encountered at tamper sensor 700 due the application of an EMP, a voltage glitch above or below a predetermined limit causes a low hold time violation or a low setup time violation in one clocked D flip-flop but not the other. On each clock cycle, elementwise compare circuit 730 compares the output of clocked D flip-flop 710 to the output of clocked D flip-flop 720. In response to elementwise compare circuit 730 detecting that less than all Q outputs of D flip-flops 710 and 720 have the same logic state, in this case where just the two D flip-flops 710 and 720, elementwise compare circuit 730 outputs a logic high signal to the D input of D flip-flop 740. D flip-flop 740 registers the logic high on the next rising edge of the CORE CLK signal to provide the FAULT signal to tamper response circuit 635, thereby detecting a fault condition. Tamper response circuit 635 enables execution of a protection operation.

By detecting a difference in logic state between the two flip-flops, tamper sensor 700 reliably detects the application of an EMP in its vicinity, and generates the FAULT signal to prevent the EMP from disrupting an important operation such as a cryptographic authentication operation and thereby to prevent the integrated circuit from being hacked. Also, while in another embodiment, i.e. one not shown in FIG. 7 or described here, another tamper sensor may include more than two flip flops, tamper sensor 700 is illustrated having exactly two.

FIG. 8 illustrates in block diagram form a tamper sensor 800 according to some embodiments. Tamper sensor includes a hold time violation detection circuit 805 labeled "F'" formed using a memory element such as a clocked D flip-flop 810, and setup time violation detection circuit 815 labeled "S'" formed using a memory element such as a clocked D flip-flop 820 and a delay element 722, an elementwise compare circuit 830, and a clocked D flip-flop 840. Clocked D flip-flop 810 has a D input, a clock input for receiving a signal labeled "CORE CLK", a clear input for receiving a signal labeled "CORE RESET", and an inverted output "$\overline{Q}$" connected to the D input, to form hold time violation circuit 805. Clocked D flip-flop 820 has a D input connected to a delay element 822, a clock input for receiving the CORE CLK signal, a clear input for receiving the CORE RESET signal, and an inverted output labeled "$\overline{Q}$" connected to delay element 822, to form setup time violation circuit 815. Elementwise compare circuit 830 has a first input connected to the $\overline{Q}$ output of clocked D flip-flop 810, a second input connected to the $\overline{Q}$ output of clocked D flip-flop 820, and an output. Clocked D flip-flop 840 has D input connected to the output of elementwise compare circuit 830, a clock input for receiving the CORE CLK signal, a clear input for receiving the CORE RESET signal, and an output for providing a signal labeled "FAULT".

Similar to tamper sensor circuit 700 in operation, elementwise compare circuit 830 detects a difference in logic state at the output of clocked D flip-flops 810 and 820 that would be encountered after the application of a fault injection such as an EMP pulse of a sufficient magnitude. Upon receipt of the CORE RESET signal, D flip-flops 810 and 820 assume the same logic state, with their $\overline{Q}$ outputs set to "1". All circuits of tamper sensor circuit 800 have common clock. If a fault injection is encountered at tamper sensor circuit 800 due the application of an EMP, a voltage glitch above or below a predetermined threshold causes a low hold time violation or a low setup time violation in one clocked D flip-flop but not the other. On each clock cycle, elementwise compare circuit 830 compares the output of clocked D flip-flop 810 to the output of clocked D flip-flop 820. In response to elementwise compare circuit 830 detecting a difference in the logic states of clocked D flip-flops 810 and 820, elementwise compare circuit 830 outputs a logic high signal to the D input of D flip-flop 740, which registers the logic high on the next rising edge of the CORE CLK signal to provide the FAULT signal to tamper response circuit 635. Tamper response circuit 635 enables execution of a protection operation.

Figure 9:
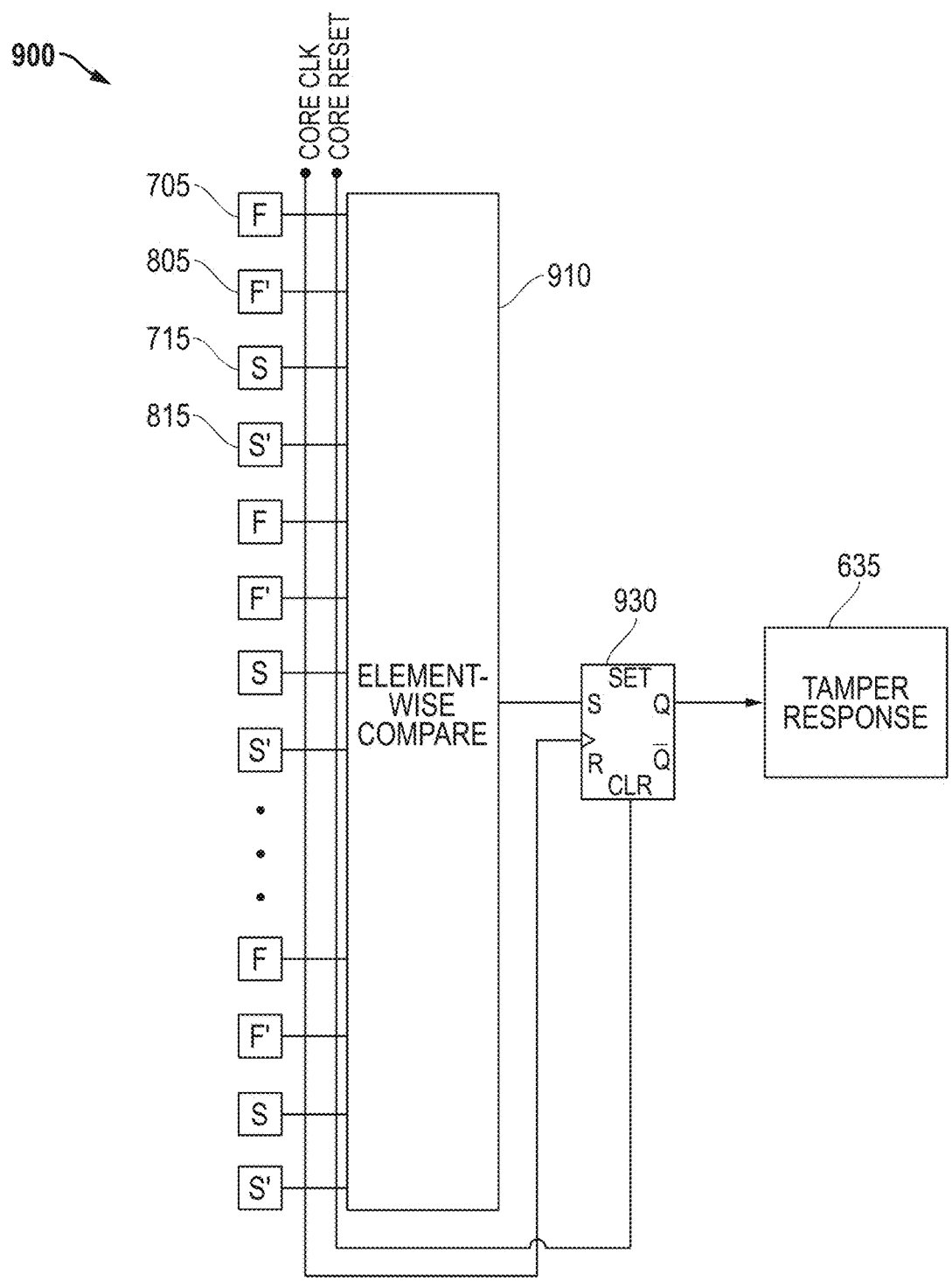
FIG. 9 illustrates in block diagram form a tamper sensor circuit for detecting a fault injection according to some embodiments.

FIG. 9 illustrates in block diagram form a tamper sensor circuit 900 for detecting fault injection according to some embodiments. Tamper sensor circuit 900 includes a set of tamper sensor circuits, an elementwise compare circuit 910, a reregister 930, and tamper response circuit 635. The set of tamper sensor circuits includes hold time violation detection circuits 705 and 805, and setup time violation detection circuit 715 and 815. Each of the plurality of tamper sensor circuits provides an output signal to elementwise compare circuit 910. Register 930 is a D flip-flop that has a D input connected to the output of elementwise compare circuit 910, a clock input for receiving the CORE CLK signal, a clear input for receiving the CORE RESET signal, and an output for providing a signal labeled "FAULT" to tamper response circuit 635. Register 930, in another example, is a different memory element or sequential storage device for storing binary information.

On an integrated circuit, hold time violation detection circuits 705 and 805 are and setup time violation detection circuits 715 and 815 are positioned in close proximity to each other to detect a fault cause by a nearby EMP. In operation, on each clock cycle F, F', S, S' is received at elementwise compare circuit 910. Elementwise compare circuit 910 compares logic states that result from each clock transition. On each clock transition during normal operation, a 0 to 1 transition is expected on one pair of setup and hold time detection circuits, while a 1 to 0 transition is expected on the other pair. Elementwise compare circuit 910 outputs a 0 to register 930 unless it detects a difference in the expected output of the logic states, that result from each clock transition, in which elementwise compare circuit 910 outputs a 1. Register 930 captures the 1 on the next rising edge of the CORE CLK, and holds the 1 until the core is reset.

Figure 10:
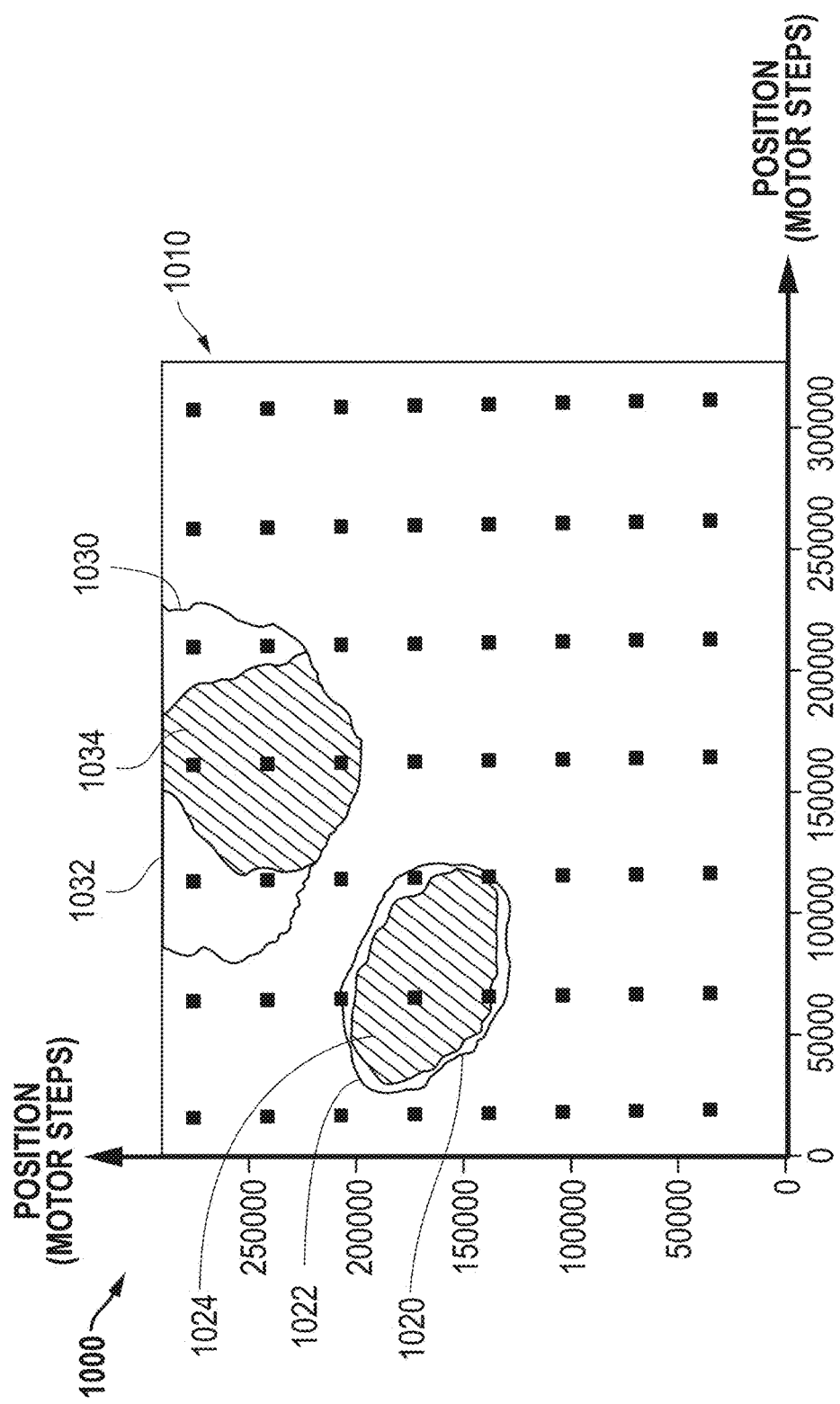
FIG. 10 illustrates in graphical form a superimposed perspective of FIG. 5 and tamper sensor circuit distribution on an integrated circuit according to some embodiments.

FIG. 10 illustrates in graphical form a superimposed perspective of FIG. 5 and tamper sensor circuits distribution on an integrated circuit according to some embodiments. Graph 1000 includes tamper sensor circuits 1010, integrated circuit 1032, and glitch result 1020, 1024, 1030, and 1034. In this embodiment, tamper sensors (705, 805, 715, and 815) are distributed by less than a predetermined distance related to an expected fault injection area throughout integrated circuit 1032. The network of tamper sensors formed enable detection of glitch result 1020, 1024, 1030, and 1034 resulting from the fault injection analysis illustrated in FIG. 5.

Figure 11:
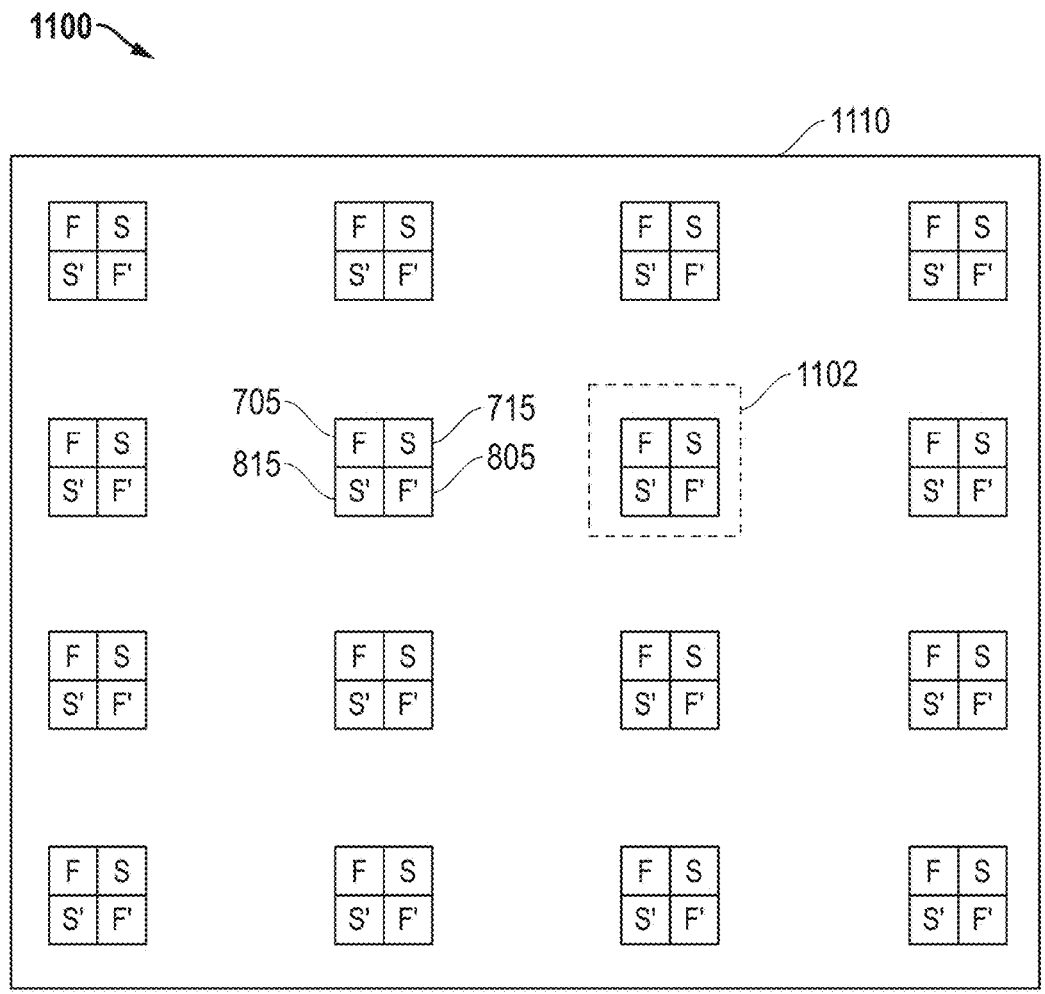
FIG. 11 illustrates in block diagram form a distribution of tamper sensor circuits on an integrated circuit layout according to some embodiments.

FIG. 11 illustrates in block diagram form a distribution of tamper sensor circuits on an integrated circuit layout according to some embodiments. Layout 1100 includes integrated circuit 1110, hold time violation detection circuit 705 and 805, and setup time violation detection circuit 715 and 815. Hold time violation detection circuit 705 and 805, and setup time violation detection circuit 715 and 815 are positioned as a set of unit cells 1102.

Hold time violation detection circuit 705 and 805, and setup time violation detection circuit 715 and 815 can be positioned in a variety of arrangements throughout an area of integrated circuit 1110. The advantage of distributing set of unit cells 1102 throughout an integrated circuit is for local detection of the respective fault injection that triggers either a low hold time violation or a low setup time violation. Alternatively, hold time violation detection circuit 705 or 805, and setup time violation detection circuit 715 or 815 can be placed as hold time/setup time violation detection pairs (705 and 715 or 805 and 815), or as individual circuits (705, 715, 805, and 815) throughout an integrated circuit. In another embodiment, hold time violation detection circuit 705 and 805, and setup time violation detection circuit 715 and 815 are positioned to protect specified components of an integrated circuit.

In one particular embodiment, an integrated circuit with tamper protection can be manufactured as follows. First, the integrated circuit is laid out to form a layout such as layout 1100. Generally, an integrated circuit designer provides a netlist for the integrated circuit to a commercially available place-and-route tool, which automatically lays out the electronic components in the integrated circuit to meet timing requirements. However, the designer indicates the desired locations of unit cells 1102 to the place-and-route tool. The method includes defining a set of unit cells 1102 each having a set of state circuits. Each state circuit includes a complementary output connected to a true input thereof, and also has a clear input, a clock input, and an output. The method includes connecting a reset signal to the clear input of each of unit cells 1102, and a clock signal to the clock input of each of unit cells 1102. The method includes distributing unit cells 1102 across the layout, and in particular separating each unit cell 1102 from neighboring unit cells by a distance corresponding to a gradient of an electromagnetic pulse of a predetermined magnitude. The method includes connecting outputs of the set of state circuits to an element-wise compare circuit, an output of the element-wise compare circuit to a register, and an output of the register to a tamper response circuit.

Second, the integrated circuit is fabricated according to the layout. The fabrication can be performed using conventional integrated circuit fabrication processes for complementary metal-oxide-semiconductor (CMOS) chips. The fabrication process includes steps such as doping the semiconductor wafer to form active regions of transistors, patterning and etching gate electrodes and electrical interconnects, polishing various layers for planarization, testing the completed integrated circuit die, packaging the integrated circuit die in integrated circuit packages for mounting onto printed circuit boards, and the like.

The above-disclosed subject matter is to be considered illustrative, and not restrictive, and the appended claims are intended to cover all such modifications, enhancements, and other embodiments that fall within the true scope of the claims. In one embodiment, a basic tamper sensor circuit includes a hold time violation detection circuit and a setup time violation detection circuit. Each circuit respectively detects the respective fault injection triggering either a low hold time violation or a low setup time violation. In one example, setup time and hold time violation circuits are randomly distributed on an integrated circuit. In another example, setup time and hold time violation circuits are strategically placed to secure a specified element on an integrated circuit. In an alternative embodiment, the tamper sensor circuit includes paired clusters of setup time and hold time violation circuits. In still, another embodiment, the tamper sensor circuit utilizes quad clusters. Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrated circuit comprising:
a tamper sensor having a plurality of state circuits each having a respective output that provides a respective logic state and toggling said respective logic state in response to a clock signal when operating properly, and failing to toggle said respective logic state in response to a respective fault injection, wherein said tamper sensor has an output that provides a fault signal in response to a difference in said respective logic state of said plurality of state circuits;
a protected circuit; and
a tamper response circuit coupled to said tamper sensor and to said protected circuit, for executing a protection operation to secure said protected circuit in response to said fault signal.

2. The integrated circuit of claim 1 wherein said protected circuit comprises a data processor and said protection operation comprises blocking a debug operation.

3. The integrated circuit of claim 1 wherein said protection operation further comprises providing a memory erase operation to said protected circuit.

4. The integrated circuit of claim 1 wherein said protection operation further comprises providing an invalidation operation for invalidating outcome of a cryptographic authentication operation.

5. The integrated circuit of claim 1 wherein said tamper sensor further detects a hold time violation.

6. The integrated circuit of claim 5 wherein said tamper sensor detects said hold time violation using a first register, said first register having a data input and a complementary output coupled to said data input, and a true output.

7. The integrated circuit of claim 1 wherein said tamper sensor further detects a setup time violation.

8. The integrated circuit of claim 7 wherein said tamper sensor detects said setup time violation using a register circuit, said register circuit having a register, a delay element having an input coupled to a data input of said register and said delay element having an output coupled to a complimentary input of said register, and said register having an output.

9. The integrated circuit of claim 1 wherein said tamper sensor comprises:
a first register clocked in response to said clock signal and detecting a hold time violation;
a register clocked in response to said clock signal and detecting a setup time violation;
a comparison circuit for comparing an output of said first register to an output of said register; and
an output register clocked in response to said clock signal, and having a data input coupled to an output of said comparison circuit, and an output for providing said fault signal.

10. The integrated circuit of claim 9 wherein said comparison circuit receives a true output of said first register and said register.

11. The integrated circuit of claim 9 wherein said comparison circuit receives a compliment output of said first register and said register.

12. The integrated circuit of claim 9 wherein said first register and said register are separated on said integrated circuit by less than a predetermined distance related to an expected fault injection area.

13. The integrated circuit of claim 9 wherein said first register and said register are juxtapose on said integrated circuit in quad unit cell sets for local detection of said respective fault injection.

14. The integrated circuit of claim 13 wherein said quad unit cell sets are distributed in an array across said integrated circuit.

15. The integrated circuit of claim 1 wherein said tamper sensor further detects said respective fault injection in response to an electromagnetic pulse injection having an absolute value that exceeds a predetermined magnitude.

16. The integrated circuit of claim 1 wherein said tamper sensor further detects said fault injection when said respective fault injection is induced via a voltage glitch.

17. The integrated circuit of claim 1 wherein said tamper sensor further detects said respective fault injection when said respective fault injection is induced via a clock glitch.

18. A tamper sensor for detecting a fault injection, comprising:
a plurality of state circuits each having a respective output that provides a respective logic state and toggling said respective logic state in response to a clock signal when operating properly, and failing to toggle said respective logic state in response to a respective fault injection;
a comparison circuit for comparing an output of said plurality of state circuits, wherein said comparison circuit provides a respective output; and
a tamper response circuit coupled to a register having an input coupled to the output of the comparison circuit, a clock input for receiving the clock signal, and an output that provides a fault signal in response to a difference in said respective logic state of said plurality of state circuits.

19. The tamper sensor of claim 18 wherein said plurality of state circuits detect a setup time violation and a hold time violation in response to said respective fault injection.

20. The tamper sensor of claim 19 wherein said plurality of state circuits is a unit cell having a pair of state circuits for detecting said setup time violation and said hold time violation.

21. The tamper sensor of claim 19 wherein said plurality of state circuits is a unit cell having a quadrant of state circuits for detecting said setup time violation and said hold time violation on each clock transition.

22. The tamper sensor of claim 19 wherein each of said plurality of state circuits comprises:
- a first register, said first register having a data input and a complementary output coupled to said data input, and a true output for detecting said hold time violation; and
- a register circuit, said register circuit having a register, a delay element having an input coupled to a data input of said register and said delay element having an output coupled to a complimentary input of said register, and said register having an output for detecting said setup time violation.

23. A method comprising:
- distributing a first plurality of state circuits on an integrated circuit, wherein each of said first plurality of state circuits has a complementary output coupled to a true input thereof;
- initializing each of said first plurality of state circuits to a first logic state;
- clocking each of said first plurality of state circuits using a clock signal;
- detecting a fault condition in response to less than all outputs of said first plurality of state circuits being in the same logic state; and
- executing a protection operation for said integrated circuit in response to said fault condition.

24. The method of claim 23, wherein said executing said protection operation comprises
- temporarily invalidating an operation targeted during detection of said fault condition.

25. The method of claim 23, wherein said executing said protection operation comprises
- permanently invalidating an operation targeted during detection of said fault condition.

26. The method of claim 23, wherein said distributing said first plurality of state circuits on said integrated circuit comprises:
- distributing a hold time violation circuit and a setup time violation circuit in proximity to said hold time violation circuit on said integrated circuit.

27. The method of claim 26, wherein said distributing said first plurality of state circuits on said integrated circuit comprises:
- distributing a plurality of unit cells on said integrated circuit, each unit cell comprising a respective hold time violation circuit and a respective setup time violation circuit in proximity to said respective hold time violation circuit.

28. The method of claim 26 further comprising:
- distributing a second plurality of state circuits on said integrated circuit, wherein each of said second plurality of state circuits has a complementary output coupled to a true input thereof;
- initializing each of said second plurality of state circuits to a second logic state opposite said first logic state;
- clocking each of said second plurality of state circuits using said clock signal; and
- detecting said fault condition further in response to less than all outputs of said second plurality of state circuits being in the same logic state.

29. The method of claim 28, wherein said distributing said second plurality of state circuits on said integrated circuit comprises:
- distributing a respective hold time violation circuit and a respective setup time violation circuit in proximity to said respective hold time violation circuit on said integrated circuit.

30. The method of claim 28, wherein said distributing said second plurality of state circuits on said integrated circuit comprises:
- distributing a plurality of unit cells on said integrated circuit, each unit cell comprising a respective hold time violation circuit and a respective setup time violation circuit of said first plurality of state circuits and a respective hold time violation circuit and a respective setup time violation circuit of said second plurality of state circuits in proximity to each other.

* * * * *